March 7, 1967 A. JUNGINGER 3,307,921
APPARATUS FOR CONTROLLING CHEMICAL REACTOR
TEMPERATURES BY MEANS OF SUPERHEATED STEAM
Original Filed April 15, 1963

United States Patent Office 3,307,921
Patented Mar. 7, 1967

3,307,921
APPARATUS FOR CONTROLLING CHEMICAL REACTOR TEMPERATURES BY MEANS OF SUPERHEATED STEAM
Alberto Junginger, Milan, Italy, assignor to Montecatini Edison S.p.A., Milan, Italy
Original application Apr. 15, 1963, Ser. No. 272,980. Divided and this application May 25, 1965, Ser. No. 458,622
Claims priority, application Italy, Apr. 13, 1962, 7,365/62
3 Claims. (Cl. 23—288)

This application is a division of my copending application Serial No. 272,980, filed April 15, 1963.

This invention relates to apparatus for controlling chemical reactor temperatures by means of super-heated steam, and more particularly for the control of exothermic reactions carried out in catalytic multi-layer systems or multi-stage exothermic reactions producing hot streams of fluids at or intermediate a plurality of stages.

In reactors where oxothermic chemical reactions are taking place, and particularly when the reaction is occurring between gases with the aid of fixed-bed catalysts, it is frequently desirable to remove heat from the reaction fluid. The catalyst is generally subdivided in various layers and the excess heat is removed from the reaction fluid between each layer so as to adjust the temperature to values most suitable for attaining a high reaction rate and a good conversion yield.

For this purpose, various methods have been used, such as employing heat exchangers traversed at one side by the fluid to be catalyzed, and at the other side by the fluid already more or less catalyzed; or by utilizing heat exchangers traversed on the one side by the fluid to be cooled, and on the other side by cooling fluids.

For example, when sulfuric acid is to be produced from sulphur, the cool dry air which, for reasons of equilibrium, is used to dilute the $SO_2$ feed gas, is sometimes used as a cooling fluid in conventional heat exchangers. When it is desired to recover for further use the heat produced in the exothermic reaction, a boiling liquid, generally water, may be used as a fluid for heat removal, provided the reaction temperature is sufficiently high to obtain a steam having sufficiently high pressure for ordinary uses. However, this latter expedient introduces a number of difficulties in the temperature control of the reactor fluid. Owing to the constancy of the boiling temperature of the cooling fluid, and since the latter for obvious reasons must keep the pressure constant, it is possible to adjust the reactor temperature by varying the amount of cooling fluid entering the cooler, by means of a by-pass system. In this case, however, a mixer is subsequently needed for the fluid re-entering the reactor in order to restore the homogeneous temperature of the by-passed fraction and of the fraction passed through the cooler.

In addition to the conventional system above-described, other systems have also been used, but these likewise have a number of disadvantages and introduce certain complexity into the system.

It is therefore an object of the present invention to provide an apparatus for overcoming the foregoing disadvantages of the prior art.

Another object of the invention is to provide an apparatus for removing excess heat from a reaction by means of superheated steam.

A further object of the invention is to provide apparatus to utilize saturated recovered steam generally available in the same plant for controlling the temperature of an exothermic reaction.

A further object of the invention is to provide apparatus to produce as a by-product a quantity of superheated steam by utilizing the excess heat of an exothermic reaction.

Still another object is to provide for a means of adjusting the temperatures at various stages or reactor layers of an exothermic reaction in a substantially independent manner.

Still another object of the invention is to provide apparatus for maintaining a homogeneous temperature in the entire reacting fluid passing completely through heat exchangers, without any need of by-passing any portion thereof.

Still another object is to provide apparatus wherein there is no danger of flooding the catalyst in the event an exchanger should break.

A further object of the invention is to make possible the use of heat exchangers of relatively small weight and of small space requirement, which can be attached directly to the reactor or even placed inside of it.

To these ends, and in accordance with the present invention, a system is provided for removing the excess heat from the reacting fluid by means of superheated steam. According to one feature of the invention, the entire reacting fluid is passed from the reactor space through heat-exchange coolers having walls on whose other side is circulating steam or other vapor having a pressure corresponding to a boiling temperature lower than the temperature to be maintained at any point of the reactor. The inlet steam passing into the heater exchange coolers is preferably saturated steam. This steam is thus superheated in the heat exchanger at the expense of the heat of the reaction fluid. After traversing a certain path inside the heat exchanger, the superheated steam is then sent to a superheat-remover or cooler, where the steam is mixed with water, whose evaporation reduces the degree of superheat of the steam. This same steam can be made to run, preferably in counter-current flow relative to the reacting fluid, along a path through the various exchangers interposed between the layer to be catalyzed.

According to another feature of the invention, it is possible to connect various exchangers in parallel between two successive layers of catalyst, each of the exchangers having its steam tube bundle or its serpentine coil subdivided into sections which are then arranged and interconnected to serve as superheaters.

According to another feature of the invention, the superheaters of the various exchangers may be similarly arranged, and a plurality of superheat-removers or coolers are provided for reducing the superheat of the steam passing out of and back into the respective exchangers. The number and position of the superheat-removers is such as to obtain in the reacting fluid the temperature most convenient for the reaction being carried out.

According to another feature of the invention, when various heat exchangers are connected in parallel, it is advisable to collect the steam leaving the corresponding sections of the exchangers and to pass it all into one single superheat-remover. The steam, after superheat-removal, is then again subdivided before entering the following section of the exchangers connected in parallel.

The rate of water flow in the various superheat-removers or coolers is controlled, either manually or automatically, so as to maintain the steam entering a corresponding exchanger at the suitable temperature in order to have a convenient temperature of the reacting fluid. The superheat of the steam at the outlet of the last heat exchanger can be reduced down by passing it through a last superheat-remover or cooler to a value most convenient for further utilization.

The present invention is applicable in conjunction with any multi-stage of multi-step exothermic reaction producting hot streams of fluids such as gas or vapor at or intermediate a plurality of stages. In addition to the typical case of sulphur dioxide transformed into sulphuric and anhydride, given herein as an example, other exothermic reactions for which the present invention is suitable are the following:

In the field of inorganic chemistry, the invention is applicable in all oxidizing processes, as well as those relative to the production of ammonia from synthesis gas, and the production of methanol from synthesis gas. In the field of organic chemistry, the following processes may be cited by way of example of exothermic reactions for which the present invention is suitable:

Maleic anhydride from benzene plus air.
Phthalic anhydride from naphthalene plus air.
Formaldehyde from methanol plus air.
Acrolein from propylene plus oxygen.
Ethylene oxide from ethylene plus air.

The system according to the invention is particularly suitable for reactor control when the reactor fluid to be catalyzed is gaseous and the exothermic reaction occurs at a high temperature, such as for example in catalysis reactors for sulphuric acid production.

Other objects, features and many of the attendant advantages of this invention will be more readily appreciated as the same becomes better understood by reference to the following detailed description of a typical example of the system according to the invention, when considered in connection with the accompanying drawing, wherein.

Figure 1:
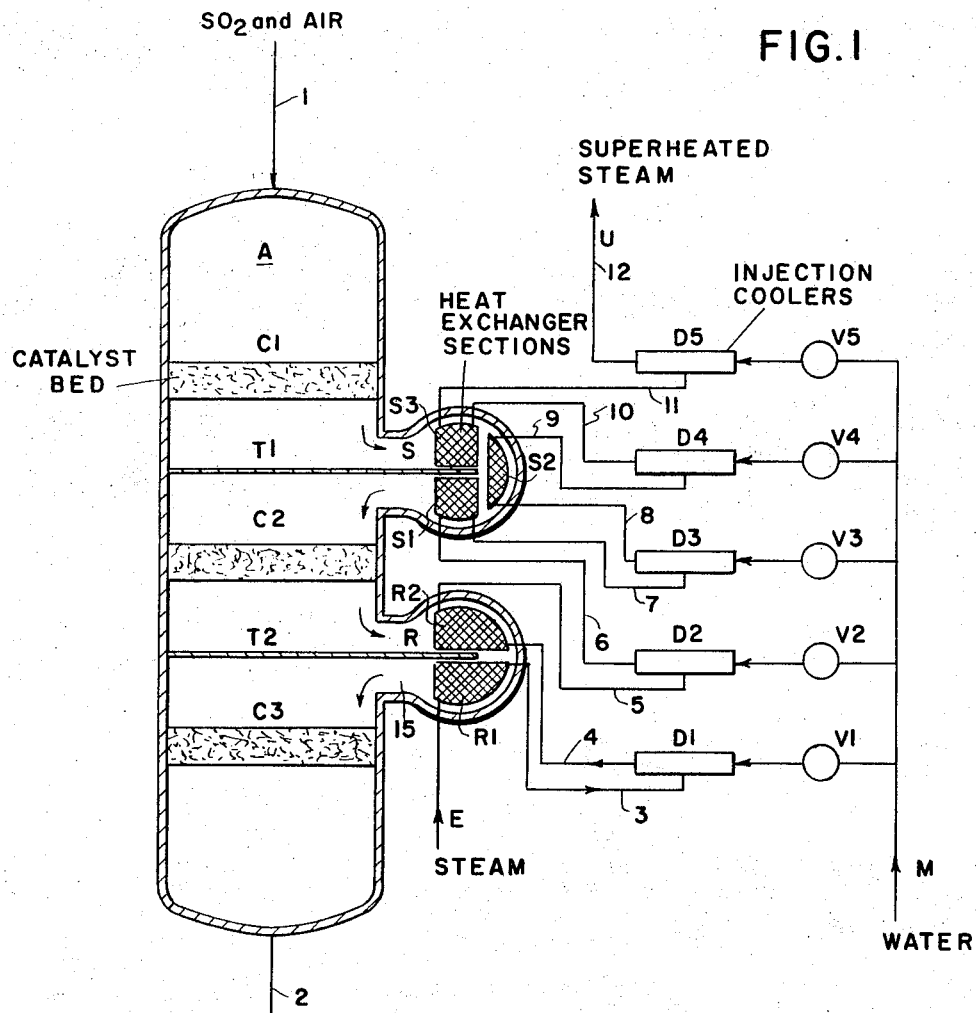
FIG. 1 is a schematic layout of the apparatus according to the invention arranged to obtain temperature control in a reaction plant for producing sulphuric acid from sulphur dioxide by catalysis.

FIG. 1 shows a reaction plant, given merely by way of an illustrative example, of a sulphuric anhydride synthesis plant which starts with a mixture of sulphur dioxide and air introduced into the top of a reactor A, and from the bottom of which at 2 the anhydride is withdrawn for further processing. The reactor is divided by walls $T_1$ and $T_2$ into separate stages or reaction chambers. The gaseous mixture of $SO_2$ and air is introduced into the top at 1 and then, after passing through three catalyst layers $C_1$, $C_2$, $C_3$, leaves as the anhydride product from the bottom of the reactor at 2. The mixture introduced at the top should have a temperature sufficiently high to prime the reaction, which then continues by itself exothermically.

According to the invention, a plurality of heat exchangers S, R, are interposed between the catalyst layers for removing excess heat from the reactor fluid as it passes from one stage to the next. After leaving layer $C_1$, the gas is passed to a heat exchanger S, provided with separate superheater sections $S_1$, $S_2$, $S_3$. In the heat exchanger S the reactor gas undergoes a cooling before it reaches the next catalyst layer $C_2$.

After leaving catalyst layer $C_2$, the reactor gas then passes into a heat exchanger R provided with a plurality of sections $R_1$, $R_2$. From the exchanger R the gas passes through the last layer $C_3$ and finally leaves the reactor vessel A to then be subjected to further processing.

The heat exchanger vessels or superheaters S and R contain tubes arranged either in bundles or in serpentine meander bands or coils. Around the tubes are chambers for flow of the reactor fluid. Steam is passed under pressure through the tubes and absorbs heat through the tube walls from the reaction fluid which has become heated by the heat of the exothermic reaction.

If desired, it is also optionally possible to make use of the heat content of the exit gas leaving the reactor at 2 by passing it through a boiler (not shown) so as to obtain the saturated steam which passes into the tubes of the heat exchangers and serves as the cooling means.

The passage of steam through the heat exchangers R and S will now be described. Saturated steam or other boilable cooling medium is introduced at E and leaves the system at U in the form of superheated steam, being increased in quantity because of the addition of water entering at M, which will be more fully described presently. Saturated steam from E enters a first tube bundle $R_1$ of the steam exchanger R, where it is superheated by heat which it removes from the gaseous reaction mixture passing through the chamber of the heat exchanger R. On leaving exchanger section $R_1$, the steam then flows through line 3 into a cooler or heat-remover $D_1$ into which is injected water coming from M. The rate of flow of water passing into the cooler $D_1$ is adjusted, manually or automatically, by means of a valve $V_1$ so that the degree of cooling or superheat of the steam coming from line 3 and passing into line 4 is controlled according to the temperature of the reaction fluid as checked at the outlet 15 of the exchanger R, where the gas leaves the exchanger R and enters into the third stage of the reactor. After leaving the superheat-remover $D_1$, the steam re-enters the exchanger R by passing through line 4 and into the second tube bundle $R_2$ of the exchanger R. Here, the excess heat of the fluids in the reactor is again reduced, the exchanger chamber of section $R_2$ receiving fluid from the stage of the reactor between catalyst $C_2$ and the wall $T_2$.

In FIG. 1, the heat exchanger R is illustrated as having two tube bundles $R_1$ and $R_2$, whereas the exchanger S is illustrated as having three tube bundles, $S_1$, $S_2$, $S_3$. Of course, the number of tube bundles or sections of tubes in each exchanger, as well as the number of heat exchangers, may change according to process requirements.

The coolers $D_2$, $D_3$, $D_4$, $D_5$ are similar to and operate in a manner analogous to that above-described relative to the water-injector cooler $D_1$ for de-superheating the steam coming from a respective superheater section of the heat exchangers R, S. The valves $V_2$, $V_3$, $V_4$, $V_5$, pertaining respectively to coolers $D_2$, $D_3$, $D_4$, $D_5$, likewise operate in a manner analogous to that above-described relative to valve $V_1$.

In FIG. 1, the different tube bundles $R_1$, $R_2$, $S_1$, $S_2$, $S_3$, of the exchangers have been shown in the illustrated embodiment as being connected in series along the steam path, which extends through lines E, 3, 4, 5, 6, 7, 8, 9, 10, 11, 12 and out at U. It will be understood by those skilled in the art, of course, that these tube bundles may optionally be connected in parallel, or combined series and parallel connected systems may be resorted to.

From the outlet of the last tube bundle $S_3$, the superheated steam passes through line 11 into and through the superheat-remover $D_5$, where, by means of valve $V_5$, the final superheat of the steam is adjusted in accordance with the further requirements of the service for which the steam is to be used after it passes out through line 12 and outlet U.

It will be recognized from the foregoing that the quantity of superheated steam leaving from U is clearly higher than that of the saturated steam which enters through E, because of the addition of water at the injectors $D_1$–$D_5$.

Of course, the number of catalyst layers $C_1$, $C_2$, $C_3$, and consequently the number of superheaters or exchangers and superheat-removers may be a number different from that shown in the accompanying drawings, illustrated herein only by way of example without limitation.

Figure 2:
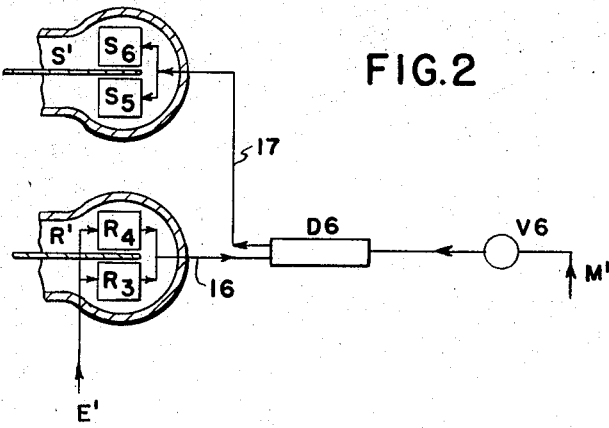
FIG. 2 is a modification of a detail of FIG. 1, showing schematically an arrangement for connecting superheaters in parallel.

In FIG. 2 is illustrated a modification of FIG. 1 in which the tube bundles or sections of the respective exchangers R', S' are connected in parallel instead of in series. Steam enters at E' into the exchanger R', passing jointly into both sections $R_3$ and $R_4$, from which the existing superheated steam leaves and is joined together into a line 16 through which it enters into the cooler or superheat-remover $D_6$, where the superheat is removed from the steam by water injection controlled by valve $V_6$ connected to a source of water $M'$. From the superheat-remover $D_6$, the de-superheated steam leaves through line 17 and then is divided before entering the separate tube bundle sections $S_5$ and $S_6$ of the heat exchanger $S'$.

In order to further explain the invention, the following example is given here with particular reference to a sulphuric plant according to FIG. 1, as compared to a conventional plant of the prior art.

*Example*

In a plant for the production of 100 t/day of sulfuric acid, the system shown in the enclosed FIG. 1 was used.

The flow rates and temperatures according to the method and apparatus of the invention are reported in Table 1 and are to be compared with the analogous data of Table 2, which refers to control by the conventional system, namely in which the heat of reaction was removed by passing the gas into exchangers into whose other side the cold dry air for the dilution of the reacting gas passes, coming from a pre-heating oven, before entering the reactor.

As a comparison of the Tables 1 and 2 shows, by the method and apparatus or system of the present invention, the amount of superheated steam leaving at U is substantially higher than that entering at E (steam production).

With the conventional system, on the contrary, heat is transferred to the air entering the reactor together with the gas; whence more cooling of the entering gas is necessary by increasing the boiler surface normally destined for that purpose. Even if this surface increase is not taken into account, the required surface area of exchangers in the conventional system is much greater than with the present invention.

TABLE 1.—CONTROL BY MEANS OF SUPERHEATED STEAM

| Exchanger | Gas | | | Steam | | | Surface Area, m.² |
|---|---|---|---|---|---|---|---|
| | Amount, Nm.³/h. | Temperature, °C. | | Amount, Nm.³/h. | Temperature, °C. | | |
| | | Inlet | Outlet | | Inlet | Outlet | |
| $R_1$ | 13,450 | 445 | 420 | 2,440 | 209 | 290 | 43 |
| $R_2$ | 13,450 | 470 | 445 | 2,570 | 230 | 308 | |
| $S_1$ | 13,550 | 490 | 440 | 2,780 | 230 | 383 | |
| $S_2$ | 13,550 | 540 | 490 | 3,180 | 230 | 370 | 110 |
| $S_3$ | 13,550 | 590 | 540 | 3,730 | 242 | 380 | |

TABLE 2.—CONTROL BY MEANS OF AIR

| Exchanger | Gas | | | Air | | | Surface Area, m.² |
|---|---|---|---|---|---|---|---|
| | Amount, Nm.³/h. | Temperature, °C. | | Amount, Nm.³/h. | Temperature, °C. | | |
| | | Inlet | Outlet | | Inlet | Outlet | |
| 1st exchanger | 13,450 | 512 | 420 | 7,000 | 65 | 254 | 120 |
| 2d exchanger | 13,550 | 590 | 480 | 7,000 | 254 | 470 | 300 |

It will be apparent to those skilled in the art, upon studying this disclosure, that apparatus according to this invention can be modified in various respects and hence may be embodied in apparatus other than those particularly illustrated and described herein by way of example, without departing from the essential features of the invention and within the scope of the claims annexed hereto.

What is claimed is:

1. Apparatus for controlling the temperature of reacting fluid passing through a multi-stage reactor having a reactor wall with vertical wall sections and successive reaction stages for exothermic reactions, comprising a heat exchanger between successive stages for exchange of heat between the reaction fluid and a cooling vapor, said heat exchanger being simultaneously within the reactor and external to the adjacent vertical reactor wall section and provided with a plurality of sections and a tube system for circulation of the cooling vapor and for superheating said vapor by said exchange of heat, cooling means interconnected in said tube system for reducing the degree of superheat of the vapor passing therethrough, liquid injection means for injecting liquid at an adjustable rate into said cooling means, and at least one baffle wall between successive reaction stages of said reactor, said baffle wall dividing the flow path of said reaction fluid through said heat exchanger sections so as to direct said reacting fluid into one of said sections and out from another of said sections.

2. Apparatus for controlling the temperature of reacting fluid passing through a multi-stage reactor having successive stages for exothermic reactions, comprising a heat exchanger between successive stages for exchange of heat between the reaction fluid and a cooling vapor, said heat exchanger being provided with tube systems for circulation and superheating therein of the cooling vapor, cooling means interconnected to said tubing systems for reducing the degree of superheat of the vapor passing therethrough, liquid injection means for injecting liquid at an adjustable flow rate into said cooling means, said reactor being provided with at least one baffle wall between successive reaction stages and extending completely across the reactor, said baffle wall dividing said heat exchanger into a plurality of sections so as to direct said reacting fluid into one of said sections and out from another of said sections, and a reactor wall with vertical wall sections, said heat exchanger simultaneously being internal of said reactor wall and external to the adjacent vertical reactor wall section.

3. Apparatus for controlling the temperature of reacting fluid passing through a multi-stage reactor having a reactor wall with vertical wall sections and at least three reaction stages for exothermic reactions, comprising a plurality of heat exchangers simultaneously within the reactor and external to the adjacent vertical reactor wall section for exchange of heat between the reaction fluid and a cooling vapor, said heat exchangers each being provided with tube systems for circulation and superheating of the cooling vapor, and cooling means interconnected in said tube systems for reducing the degree of superheat of the vapor passing therethrough, liquid injection means for injecting liquid at an adjustable flow rate into said cooling means, said reactor being provided with at least one baffle wall between successive reaction stages, said baffle wall dividing a respective one of said heat exchangers into a plurality of sections so as to direct said reacting fluid into one of said sections and out from another of said sections, a first one of said exchangers being operably associated with a first and second of said reaction stages of said reactor, said first exchanger having three heat exchange sections, and a second one of said exchangers being operably associated with a second and third stage of said reactor, said second exchanger having two heat exchange sections.

References Cited by the Examiner

UNITED STATES PATENTS

| | | | |
|---|---|---|---|
| 1,747,634 | 2/1930 | Isenberg | 23—288 |
| 1,949,122 | 2/1934 | Jeffcott | 23—288 |
| 2,898,183 | 8/1959 | Fauser | 23—289 X |
| 2,926,143 | 2/1960 | Leland | 23—288 X |
| 2,955,925 | 10/1960 | Parker | 23—288 |
| 3,010,807 | 11/1961 | Christensen et al. | 23—288 |
| 3,146,074 | 8/1964 | Drechsel et al. | 23—288 |

MORRIS O. WOLK, *Primary Examiner.*

JOSEPH SCOVRONEK, *Examiner.*